United States Patent [19]
Kirk et al.

[11] Patent Number: 5,654,063
[45] Date of Patent: Aug. 5, 1997

[54] PRESSURE SENSITIVE COVER FOR FIRE RESISTANCE

[75] Inventors: Don Kirk, Kansas City, Mo.; George Danker, Olathe; Tom Haxton, Wellsville, both of Kans.; Rob McGeary, Kansas City, Mo.

[73] Assignee: Akro Fireguard Products, Lenexa, Kans.

[21] Appl. No.: 499,023

[22] Filed: Jul. 6, 1995

Related U.S. Application Data

[60] Division of Ser. No. 27,401, Mar. 8, 1993, abandoned, which is a continuation-in-part of Ser. No. 818,842, Jan. 10, 1992, abandoned, which is a continuation of Ser. No. 617,342, Nov. 23, 1990, abandoned.

[51] Int. Cl.$^6$ .............................. B32B 3/14; B32B 7/00; B27N 9/00
[52] U.S. Cl. ................ 428/77; 428/319.1; 428/343; 428/920; 428/921; 442/20; 442/58
[58] Field of Search ........................ 428/343, 920, 428/921, 255, 247, 319.1, 256, 77

[56] References Cited

U.S. PATENT DOCUMENTS

| | | | |
|---|---|---|---|
| 3,259,536 | 7/1966 | Gaeth et al. | 428/920 |
| 3,336,153 | 8/1967 | Juda | 117/68.5 |
| 3,916,057 | 10/1975 | Hatch et al. | 428/236 |
| 3,934,066 | 1/1976 | Murch | 428/248 |
| 4,018,962 | 4/1977 | Pedlow | 428/265 |
| 4,069,075 | 1/1978 | Billing et al. | 428/920 |
| 4,265,953 | 5/1981 | Close | 428/268 |
| 4,529,467 | 7/1985 | Ward et al. | 428/920 |
| 4,699,824 | 10/1987 | Pufahl | 428/220 |
| 4,835,054 | 5/1989 | Scarpa | 428/921 |

Primary Examiner—Terrel Morris
Attorney, Agent, or Firm—Chase & Yakimo

[57] ABSTRACT

A pressure-sensitive covering having improved fire resistance. The covering, at a minimum, includes a cured layer of an intumescence material having on an inner face a layer of pressure-sensitive adhesive, with the pressure-sensitive adhesive initially being covered by a standard release sheet. To improve the structural integrity of the cured layer before and after intumescence, there may be provided a scrim in the form of an open mesh within the cured layer. To further improve the structural integrity, a base member may be applied between the cured layer and pressure-sensitive adhesive layer. The cured layer may extend peripherally beyond the base member to improve fire resistance. To improve the durability of the covering or patch, there may be provided an overlay in the form of a plastic or foil laminate which extends over the cured resin layer and peripherally beyond the resin layer. The overlay is secured to the resin layer and the substrate by a second pressure-sensitive adhesive which is not necessarily fire-resistant. The overlay will serve to feather the edges of the cured resin layer to reduce damage due to side impact, will reduce damage due to head-on impact, and will provide a shield against moisture ingress to the cured resin layer. Additionally, the pressure-sensitive adhesive for the overlay may have a relatively high bond strength, such that the overlay assists in maintaining the covering or patch in position.

13 Claims, 1 Drawing Sheet

PRESSURE SENSITIVE COVER FOR FIRE RESISTANCE

CROSS REFERENCE TO RELATED DATA

This application is a division of application Ser. No. 08/027,401, filed Mar. 8, 1993, now abandoned, which is a continuation in part of U.S. application Ser. No. 07/818,842, filed Jan. 10, 1992, which is included herein by reference, which is a continuation of U.S. application Ser. No. 07/617,342, filed Nov. 3, 1990, both now abandoned.

BACKGROUND OF THE INVENTION

1. Field of the Invention

The present invention relates in general to fire resistant materials. In particular, the present invention relates to a substrate covering having improved fire resistance.

2. Description of the Related Art

In a wide variety of applications it has long been known to take steps to improve fire resistance to aid in halting the spread of fire. For example, it is well known to provide firewalls within ships, aircraft, automobiles and buildings. Additionally, there are other applications where a specific firewall is not provided, yet the mere presence of the wall or panel provides a certain amount of fire resistance which is deemed acceptable. In such situations the structural integrity of the firewall, wall or panel must be maintained to a certain minimal degree to achieve the desired purpose.

One example would be the cargo sections or bays of aircraft. Such cargo bays often include a composite interior shell or liner which protects the various electrical, hydraulic and fuel lines adjacent the fuselage of the aircraft. During loading and unloading of cargo, however, the cargo bay liner is often damaged. This damage can result in lines being exposed, posing the danger of possible damage to these lines.

Due to the extremely important nature of these lines, repairs of the liner must meet stringent requirements. In particular, a repair patch is required to be fire-resistant, yet structurally sound.

A further example would be an electrical box within a vehicle or structure. Such boxes are typically formed of metal having a hinged door. While the metal of such boxes provides an inherent fire resistance, the seal about the edge of the door can allow ingress of flames, causing damage to the electrical equipment within the box. Similarly, seams between adjacent structural panels may provide an avenue for flame advance, reducing the effectiveness of the panels or wall segments as fire barriers.

One typical fire resistant composition is the class of intumescence materials. Such materials will produce a carbonaceous char in the form of a swelling of the material upon reaching a critical temperature. This char forms an effective barrier against ingress of flames, and also provides a thermal insulator to reduce heat transfer. While it has been known to include intumescence materials within conventional paints and coatings, the intumescence materials are in the form of dispersed ingredients within the paint, resulting in the active intumescence ingredients being relatively far apart in molecular terms. As such, there is some amount of "transport time" and the need for internal turbulence to effectively mix these active ingredients to allow the intumescence reaction to take place. This results in delays and prevents immediate protection of the substrate.

Integrated polymer compositions, wherein all of the elements needed for intumescence are provided within the polymer chain, have more recently been developed in the art. These compositions have preliminarily proven more effective as an intumescence coating since the elements necessary for the intumescence reaction are closely held within the polymer chain, requiring little, if any, transport time before the intumescence reaction is initiated.

SUMMARY OF THE INVENTION

An object of the present invention is to provide a covering which may be applied to a substrate and which has improved fire resistance.

Another object of the present invention is to provide such a covering which includes a pressure-sensitive adhesive, such that it may be quickly and easily applied to the substrate.

Another object of the present invention is to provide such a covering which includes sufficient structural integrity such that it may be employed as a repair patch.

Another object of the present invention is to provide such a covering which has excellent durability and improved humidity resistance.

These and other objects are achieved by a pressure-sensitive covering having improved fire resistance. The covering, at a minimum, includes a cured layer of an intumescence material having on an inner face a layer of pressure-sensitive adhesive, with the pressure-sensitive adhesive initially being covered by a standard release sheet. To improve the structural integrity of the cured layer before and after intumescence, there may be provided a scrim in the form of an open mesh within the cured layer. To further improve the structural integrity, a base member may be applied between the cured layer and pressure-sensitive adhesive layer. The cured layer may extend peripherally beyond the base member to improve fire resistance. To improve the durability of the covering or patch, there may be provided an overlay in the form of a plastic or foil laminate which extends over the cured resin layer and peripherally beyond the resin layer. The overlay is secured to the resin layer and the substrate by a second pressure-sensitive adhesive which is not necessarily fire-resistant. The overlay will serve to feather the edges of the cured resin layer to reduce damage due to side impact, will reduce damage due to head-on impact, and will provide a shield against moisture ingress to the cured resin layer. Additionally, the pressure-sensitive adhesive for the overlay may have a relatively high bond strength, such that the overlay assists in maintaining the covering or patch in position.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
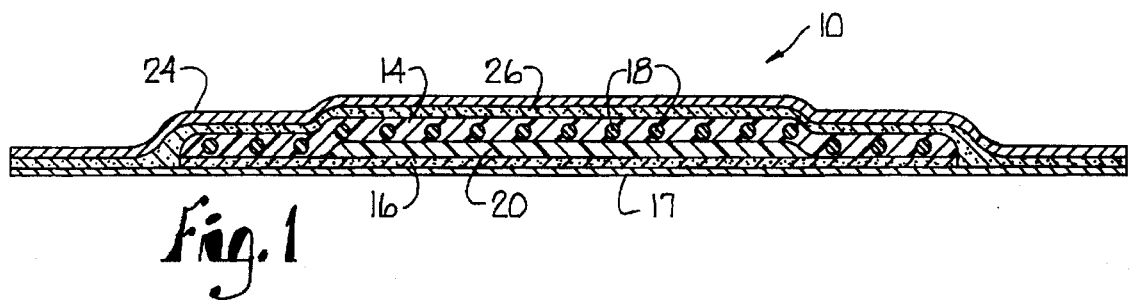
FIG. 1 is a cross-sectional side view of a covering or patch according to the present invention.
Figure 2:
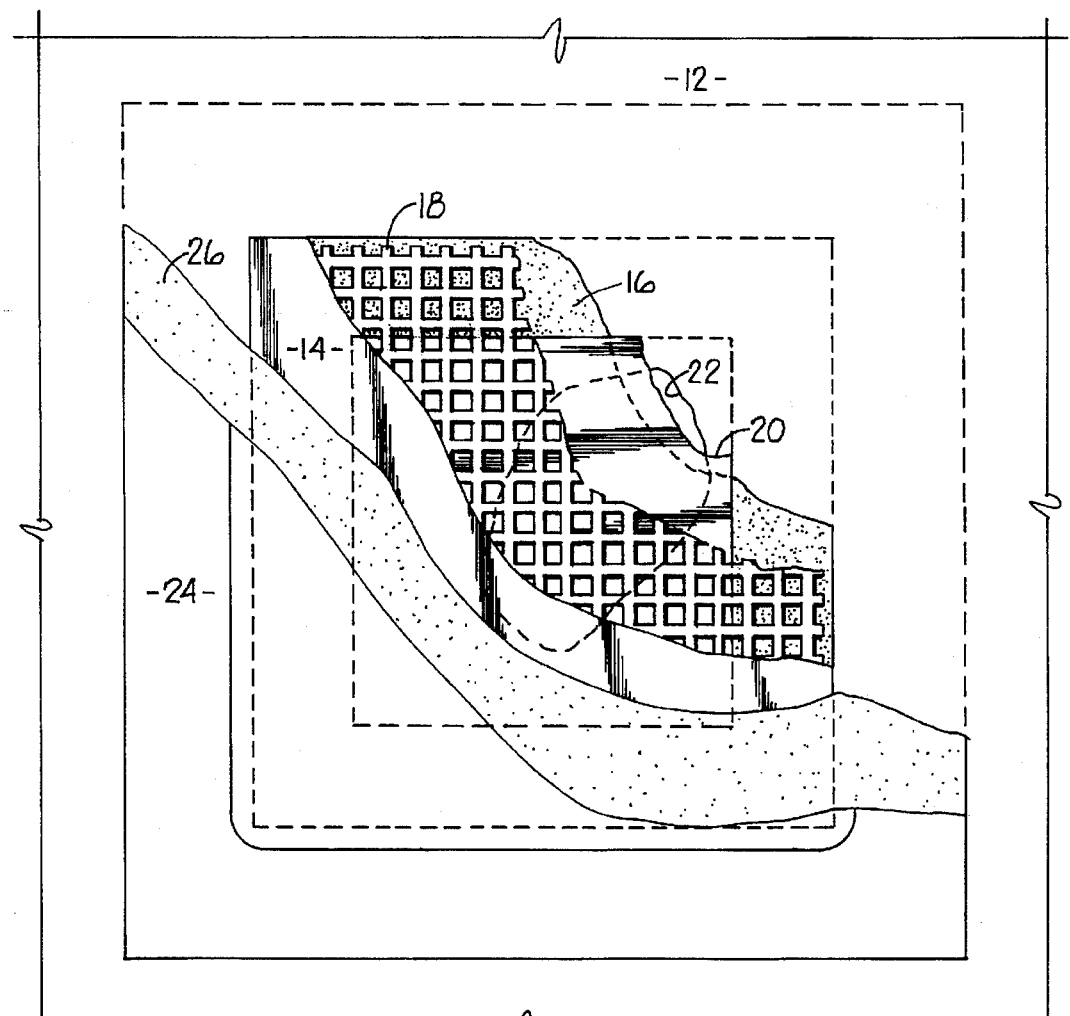
FIG. 2 is a top view in partial cutaway of an applied patch according to the present invention.

With referenced to FIGS. 1 and 2, a covering or patch according to the present invention is generally designated by reference numeral 10. The covering 10 is adapted to be secured to a substrate generally designated by reference numeral 12. The substrate may take many forms, and may be formed of many materials. For example, the substrate 12 may be formed of metal, composite materials such as fiberglass resin composites, wood, glass, ceramic or mineral substances.

The covering 10 according to the present invention, and in its most basic form, comprises a fire barrier layer 14 formed of a cured resin having intumescence properties. The barrier layer 14 may be formed of a wide variety of materials having such intumescence properties. For example, the layer 14 may be a cured resin including a fire resistant additive, such as PhosChek, available from Monsanto Corporation of St. Louis, Mo., or a fire resistant additive available from FireStop Chemical Corporation of Massachusetts under product No. FS152. In these arrangements the fire resistant additive is preferably mixed with each individual component of a two-part resin to comprise approximately 5 to 35% by weight.

Preferably, however, barrier layer 14 is formed of a reaction product of an amino-formaldehyde resin and a phosphate ester. Most preferably, the layer 14 is a cured reaction product of melamine-formaldehyde available commercially under the name Cymel 303 from American Cyanamid Company of Wayne, N.J. and a phosphate ester which will be available from Chemische Fabrik Budenheim of Budenheim, Germany, under the tradename BUDIT 380 and product No. Fb05-80. This phosphate ester is more fully described in co-pending application PCT/EP92/01186 to Aslin, which is included herein by reference. Various other additives may be provided to this basic formulation, including thixotropes such as fumed silica (preferably that sold under the trade name Aerosil®200 by Degussa Corp. of Dublin, Oh., and various surfactants.

In general, the uncured or unreacted initial composition may comprise a phosphate ester in an amount ranging from 30 to 70 wt %, preferably approximately 50 wt % of the uncured composition; water scavenger (such as the fumed silica) in an amount ranging from 0.05 to 10%, preferably 0.75 to 3 wt % of the uncured composition; water in an amount ranging from 0 to 45%, preferably 10 to 20 wt % of the total uncured composition; the melamine-formaldehyde resin in an amount ranging from 70 to 30%, preferably 40 to 20 wt % of the total uncured composition, and various other additives as may be desired.

By way of example, the layer 14 may be prepared by mixing 47.4% BUDIT 380 partial phosphate ester with 18.9% water, with mixing being performed moderately within a standard blender. An amount of 1.3% of Aerosil® 200 fumed silica is then added slowly while mixing with moderate shear. Upon obtaining a consistent product, Colortrend® titanium white shading paste (code 888-0018KX (batch 8H190, available from Huls America Inc. of Piscataway, N.J. and employed for shading of the composition and for the surfactants contained therein) may be added to an amount of 2 wt % while continuing to mix with moderate shear to provide a uniform composition.

The Cymel 303 high solids content liquid melamine-formaldehyde resin is then added in an amount of 30.4 wt %, and this composition mixed thoroughly with moderate shear. The uncured composition may then be spread to a uniform depth upon any sheet material which will provide sufficient release capabilities, such as standard silicone release sheeting. The composition is allowed to cure at least to the point where it may be readily removed from the sheeting, somewhere between 20 minutes and 3 days after application to the sheeting, depending upon formulation and temperature and humidity conditions.

The cured barrier layer 14 may be die-cut to the appropriate desired size, or may be cast to the desired size upon the release sheet material. After the layer 14 has been cut to the desired size (if necessary) and removed from the sheeting a first pressure-sensitive adhesive (PSA) layer 16 is applied to an inner face of layer 14, either by coating or by transfer. The pressure-sensitive adhesive 16 may be a continuous uniform layer across the entire face of the barrier layer at 14, may extend only about the periphery of layer 14, or may have other discontinuous patterns.

The first PSA layer 16 is preferably formed of an adhesive which will withstand relatively high temperatures, such as the temperatures which would be expected during a fire condition for the particular application. For example, PSA layer 16 may be an acrylic, silicone or natural rubber/latex adhesive. In particular, the first PSA layer 16 may be formed of Gelva® GMS 1753 from Monsanto Corporation of St. Louis, Mo.

For certain applications this covering comprising the fire barrier layer 14 of cured intumescence material with the acrylic first pressure-sensitive layer 16 may be sufficient. However, for other applications it may be found that the acrylic adhesive undergoes a reduction in viscosity at high temperatures, causing the layer 16 to fail during a fire. As such, the silicone adhesives may be preferred for layer 16. Alternatively or additionally, different thicknesses of the barrier layer and/or PSA layer, such as an increased thickness of one and/or the other adjacent their peripheries, could provide the necessary increase in adhesion and/or thermal insulation.

While the inner face of the first PSA layer 16 will be adhered to the substrate 12 when in the operative position of FIG. 2, this inner face will be covered by a release sheet 17 prior to application to the substrate. As is known in the arts, the release sheet will serve to protect the PSA layer and may consist of typical materials known in the art, and as such, will typically include a silicone or wax coating to reduce adhesion to the PSA layer 16. The release sheet 17 may be a single sheet covering the entirety of the PSA layer 16, or may include one or more slits (not shown) such that the release sheet 17 may be removed in segments after placement upon the substrate, to aid in proper placement, as is known in the arts.

Where the barrier layer 14 and adhesive layer 16 comprise the entire covering it may also be found that the preferred formulation for the barrier layer 14 is too brittle for certain applications, such that it will shatter or break upon impact. To increase the durability of the layer 14 it may be desirable to embed one or more layers of scrim material, indicated by reference numeral 18.

The scrim 18 is preferably in the form of an open mesh lattice or screen netting of fiberglass elements connected together at their intersection. The diameter of the elements have been exaggerated in the drawings for clarity. Materials other than fiberglass, including carbon fibers or ceramics could also be used for the scrim. Such a lattice will consist of approximately 5 to 25 elements per inch in two perpendicular directions, and will thus include relatively large void areas between the elements. Suitable stock material to form the scrim may be obtained from Permaglass-Mesh Incorporated of Ohio under product No. 207A.

The scrim 18 may be readily envisioned to provide structural support for the barrier layer 14 in a manner similar to a standard woven or felted fiberglass mat in a resin fiberglass composite sheet. In fact, a standard fiberglass woven or felted sheet could be employed within the layer 14 for such structural enhancement. However, upon intumescence the char will form upon an outer face of the barrier 14. While this char provides an effective fire barrier and thermal insulator, it is relatively fragile. If a section of the char were to fall from the barrier 14 that portion of the barrier loses some of its fire resistance and thermal insulative properties. The newly exposed portion of the barrier layer may intumesce to take its place, but as may be envisioned, the barrier layer 14 will at some point be fully sacrificed, rendering the cover ineffective for further fire resistance.

It is to reduce or eliminate this possibility that the scrim 18 having the large mesh size is employed. In particular, use of a standard fiberglass cloth having a relatively tight weave or a felted configuration would result in the fiberglass cloth acting as a substrate having both sides coated to form the barrier layer 14. The outer portion of the barrier which intumesces will have a tendency to fall from such a substrate. However, where the scrim 18 is formed as shown with the relatively large void areas between the elements, the scrim will not act as a substrate, but rather as a reinforcement for the char. In particular, the char will form above and below the scrim, but will also form within the void areas of the scrim, such that the scrim is held within the char in a manner similar to reinforcement steel in concrete. If a section of the char were to crack away from adjoining areas, the scrim will serve to maintain such a char portion in position, maintaining the integrity of the covering.

Since the scrim 18 may act as a structural support both before and after intumescence, it may be desirable to provide two or more layers of the scrim. This would allow an outer one of the scrim layers to be surrounded by, and support, the char formed during intumescence, while another of the scrim layers remains embedded within the portion of barrier layer 14 which has not yet intumesced. It is also possible to employ a lower layer of standard fiberglass fabric or other material for structural support of non-intumesced portions of layer 14 with one or more upper layers of the scrim material, all being initially embedded within the barrier layer 14.

Alternatively or additionally, the barrier layer may include chopped fibers of fiberglass or ceramic material to provide similar support.

Another method to provide structural support is for the covering to include a base member 20 as an alternative to, or in addition to, the scrim(s).

The base member 20 is an element separate and distinct from any structural item(s) embedded within the barrier layer 14. While the barrier layer 14 by itself, and especially with an embedded structural support element such as the scrim 18, may be sufficiently structurally sound when placed upon a continuous substrate 12, the base member 20 is preferably employed in those applications where the substrate 12 is discontinuous. For example, the substrate 12 may include a seam as between adjoining panels of the substrate, or may include a damaged portion 22 in the form of a hole or weakened area within the substrate 12.

Where the present cover is employed for this purpose, the material employed for the base member 20 will be determined by the amount of structural integrity required in the particular application. As such, the base member 20 may be formed of an extremely wide variety of materials. For example, the base member 20 may be formed of paper, such as Kraft paper, foils such as aluminum foils, plastic sheet material, ceramics, fiberglass/ceramic/carbon fiber-resin composite sheets, thicker sheets of metals such as aluminum or stainless steel, and laminates of such materials. For the particular application of the covering 10 as a repair patch for aircraft cargo bay liners, the base member 20 may advantageously be formed of a sheet of the same Conolite® material as is normally employed originally for the cargo bay walls.

The base member 20 may be secured to the barrier layer 14 by an adhesive, such as the first PSA layer 16, but is preferably fixed by the natural bonding of the curing of the barrier layer 14. In particular, it is preferred that the base member 20 is applied to the barrier layer 14 while it is still in an uncured state, and allowed to remain in contact during the curing process to be rigidly secured to the barrier layer.

It is preferred that the barrier layer 14 cover at least a substantial portion of the outer face of the base member 20, and preferably at least the entirety of such outer face. Where the barrier layer 14 does cover the entire outer face of the base member 20 such that they have substantially identical peripheries, the first PSA layer 16 must obviously be provided upon the inner face of the base member 20 rather then the inner face of the barrier layer 14 to allow the cover to be secured to the substrate. In such a case, the first PSA layer 16 is referred to as being connected to an inner face of the barrier layer 14, which language is intended to encompass this situation where the PSA layer is connected to the barrier layer via the base member 20, as well as the case where the PSA layer is directly in contact with the barrier layer, and combinations of both.

In certain situations it may be desirable for the barrier layer 14 to have a periphery which extends beyond, and is thus greater than, that of a base member 20. For example, where the PSA layer 16 is formed of an adhesive which is merely adequate for the desired application, an extra level of safety may be achieved by extending the barrier layer 14 beyond the base member 20 such that the barrier layer may act as a protector, and in particular a thermal insulator, to the portion of the PSA layer 16 which is upon the inner face of the base member 20. The particular amount by which the barrier layer extends beyond the base member will depend upon the particular application.

For example, the barrier layer 14 may merely wrap about the peripheral edges of the base member at its normal thickness. Alternatively, the barrier layer 14 may extend beyond the periphery of the base member by a relatively large amount, such as 2.5 cm, 5 cm, or more to define a peripheral portion of the barrier layer, shown in FIGS. 1 and 2. Where this is the case the first PSA layer 16 will preferably be in direct contact with the inner face of the base member 20 and with the inner face of the peripheral portion of the barrier layer (assuming the PSA layer is formed as a continuous layer). As noted above, the PSA layer need not be continuous, and even where the barrier layer extends beyond the periphery of the base member, the PSA layer may extend only over the inner face of the base member, over only the peripheral portion of the barrier layer, or some combination thereof.

The peripheral shape for the barrier layer and/or base member, as well as the peripheral size of such members may be determined by the particular application. For example, in the application of the covering 10 as a repair patch for cargo bay liners, the base member 20 preferably extends approximately 5 cm beyond all points of the damaged area 22, with the barrier layer 14 extending an additional 5 cm beyond the outer periphery of the base member. For this particular application it is also preferred that the first PSA layer 16 be a continuous coating across the inner face of the entirety of the base member and the peripheral portion of the barrier layer.

While the structure described above is sufficient for certain applications, the covering 10 accordingly to the present invention preferably also includes an overlay 24 connected to the outer face of the barrier layer 14.

A first purpose of the overlay 24 may be to act as a moisture barrier. Certain formulations of the barrier layer 14, and in particular the preferred formulation employing the phosphate ester, are subject to damage by water or moisture. As such, to maintain the desired intumescence properties of the barrier layer, the overlay 24 may act as a seal over the entirety of the barrier layer 14. In such a case, the overlay 24 will be formed of a material which at least inhibits and preferably totally prevents the passage of moisture or liquid water therethrough. For example, the overlay may be formed of plastic sheet or film, a metal foil, a natural or synthetic rubber, such as chlorinated rubber, or a laminate of two or more such materials.

As noted above, the overlay 24 is connected to the outer face of the barrier layer 14. This connection may be by the natural adhesion of the barrier layer, as by placing the overlay in contact with the uncured barrier layer and allowing curing to occur, natural adhesion of the overlay as by coating the barrier layer with an overlay material and allowing curing to occur, or the overlay may be held in position by a second adhesive layer 26 interposed between the overlay 24 and barrier layer 14. Where the overlay 24 is employed as a moisture barrier or seal, it may be readily envisioned that it is important that this seal extend over the entirety of the barrier layer. For this reason, it is preferred in such a situation that the overlay 24 extend outwardly beyond the outer periphery of the barrier layer 14, with this outer peripheral portion being secured directly to the substrate. This portion of the overlay 24 beyond the periphery of layer 14 may be secured to the substrate 12 by means of a separate adhesive other than that of second adhesive layer 26, but for ease of use and manufacturer it is preferred that the second adhesive layer 26 perform both purposes. This arrangement is shown in FIGS. 1 and 2, where the adhesive layer 26 extends to the outer periphery of the overlay 24, with the release sheet 17 covering the entirety of the adhesive area.

As it is the barrier layer 14, rather than the overlay 24 and adhesive layer 26, Which provides the intumescence fire protection, the overlay and adhesive layer 26 need not be formed of specialized, and typically expensive, fire resistant materials. This may be further used to advantage in that the adhesive layer 26 may be formed of a pressure-sensitive adhesive providing a much stronger adhesive bond that of the first PSA layer 16. This would maintain all of the advantages of ease of application and fire resistance, while further increasing the attachment of the covering to the substrate 12. While such an arrangement is preferred, an alternative is to simply extend the first PSA layer 16 outwardly beyond the outer periphery of the barrier layer 14 to the outer periphery of the overlay 24.

A further additional or alternative purpose for the overlay 24 is to provide smooth transitions in thickness for the covering 10. As is best shown in FIG. 1, the thickness of the base member 20 with PSA layer 16 may be appreciable (on the order 10 mil) for certain applications. Typical manufacturing techniques for the barrier layer 14 will provide a constant thickness, such that there is a relatively abrupt edge at the periphery at the barrier layer. There may therefore be a tendency for objects sliding against the substrate 12 to impact against the peripheral edge of the barrier layer, causing damage or removal of the covering. The application of the overlay with the second adhesive layer 26 shows that the transitions about the edge of the barrier layer may be greatly smoothed, providing a feathering effect about the periphery.

In addition to protection against impacts upon the peripheral edges, the overlay may also provide a certain degree of cushioning protection against impacts upon the barrier layer in the normal direction. The degree of protection will, of course, depend upon the thickness and material of the overlay, and may be enhanced by the presence of the second adhesive layer 26 between the outer face of the barrier layer and the inner face of the overlay.

The overlay 24 may also provide a convenient indicia display. For example, company logo, installation instructions or information, or other information may be printed upon the outer face of the overlay. The user may also provide indicia upon the overlay, such as installation date, installation procedure, size of damage covered, etc.

The covering as described above is preferably manufactured from the inner face out. In particular, a strip of the release sheet 17 may be provided with appropriately shaped and longitudinally spaced patterns of the first PSA layer 16. The base member 20, if employed, is thereafter placed upon each PSA layer pattern. The uncured barrier layer 14 is then placed over the base member and/or PSA layer pattern. The barrier layer may be formed by a single or by several coatings of the uncured formulation, and these multiple coatings of the formulation may be interspersed with application of the scrims 18, or the scrims 18 may be placed directly upon the PSA layer and/or base member, with the barrier layer formulation applied over the scrim. In either case, it is preferred that at least one coating of the barrier layer formulation be applied over the uppermost scrim 18.

If the covering is to include an overlay 24, this item is next applied. This is preferably carried out by allowing the barrier layer formulation to cure, and thereafter spreading a continuous layer of the second adhesive layer 26 over and beyond the barrier 14, and thereafter applying the overlay 24 in strip form. These strips of multiple coverings 10 may then be sheared or die-cut to the final shape. Other manufacturing techniques are, of course, possible, including forming the covering from the outer face inward, substantially opposite to that described above.

As may be readily seen from, the covering described above, will provide improved fire protection with extreme ease of use. In particular, the worker need only remove the release sheet 17 and apply the covering to the substrate 12 with manual pressure to fully mount the covering according to the present invention. There is no need for mixing or spreading of materials, thus reducing the amount and level of skill of labor required.

While the above arrangement is preferred, it is also possible to form the covering 10 according to the present invention for multiple applications steps. For example, the base member may be provided with a pressure-sensitive layer and release sheet, the barrier layer provided with a pressure-sensitive layer and release sheet, and the overlay 24 provided with a pressure-sensitive layer and release sheet. In such an embodiment the worker would perform three sequential operations of removing the release sheet and applying that element to the substrate 12 and any underlying elements, such that the final formed covering substantially corresponds to that shown in FIG. 1. While such an arrangement has increased labor requirements, the reduction in manufacturing expenses may offset this. In a similar manner, the covering could be provided as two separate elements, with the base member and barrier layer combined as a single element, or the barrier layer and overlay combined as a single element.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A patch for covering a damaged portion of a wall of a fire resistant container, the damaged portion having an outer periphery within the wall the patch, comprising:

an adhesive layer for attaching said patch over the outer periphery of the damaged portion;

a fire barrier layer composed of cured intumescence material and having an outer periphery, an inner face and an outer face, said fire barrier layer's outer periphery presenting an area larger than the outer periphery of the damaged portion and extending outwardly beyond the damaged portion's outer periphery upon adhesion of said patch to the wall, said inner face being attached to said adhesive layer;

a scrim embedded within said fire barrier layer, having an outer periphery presenting an area substantially equal to said area of said fire barrier layer; and an overlay on said outer face of said fire barrier layer, forming a moisture barrier therefor and having an outer periphery presenting an area greater than said area of said fire barrier layer, said periphery of said overlay extending outwardly beyond said periphery of said fire barrier layer.

2. A patch as claimed in claim 1, wherein said adhesive layer extends only around said outer periphery of said fire barrier layer.

3. A patch as claimed in claim 1, further comprising a base member on said inner face of said fire barrier layer, said base member being fire resistant and providing additional support to said fire barrier layer.

4. A patch as claimed in claim 1, wherein said scrim includes intersecting elements, the number of said elements being within the range of approximately 5–25 per inch to thereby form relatively large void areas between said elements, with said void areas being filled with said intumescence material as a result of said scrim being embedded.

5. A patch as claimed in claim 1, wherein said scrim includes intersecting elements, the number of said elements being within the range of approximately 5–25 per inch to thereby form relatively large void areas between said elements, with said void areas being filled with said intumescence material as a result of said scrim being embedded.

6. A patch as claimed in claim 1, wherein said overlay is attached to said fire barrier layer by a second adhesive layer.

7. A patch as claimed in claim 6, wherein said second adhesive layer extends continuously across said area of said overlay.

8. In combination with a wall of a fire resistant container where the wall has a damaged portion with an outer periphery defining its area, the improvement comprising:

a fire-resistant patch which seals said damaged portion, said patch including a fire resistant layer and an adhesive layer, said fire resistant layer being composed of cured intumescence material and having an inner face and an outer face and presenting an outer periphery defining an area therewithin, said area being greater than said area of said damaged portion, said adhesive layer being attached to said inner face of said fire resistant layer and securing said fire resistant layer over said area of said damaged portion with said outer periphery of said fire resistant layer extending beyond said periphery of said damaged portion.

9. The combination as claimed in claim 8, wherein said patch includes a scrim member embedded within said fire resistant layer to provide support thereto.

10. The combination as claimed in claim 8, wherein said patch includes a base member and an overlay, said base member being on said inner face of said fire resistant layer and providing additional support thereto, and said overlay being on said outer face of said fire resistant layer for protecting said patch from moisture and other damage.

11. The combination as claimed in claim 10, wherein said base member presents an outer periphery forming an area larger than said area of said damaged portion, and said area of said fire resistant layer is larger than said area of said base member so that a portion of said fire resistant layer extends beyond said periphery of said base member.

12. The combination as claimed in claim 11, wherein said overlay presents an outer periphery forming an area larger than said area of said fire resistant layer so that a portion of said overlay extends beyond said periphery of said fire barrier layer.

13. The combination as claimed in claim 11, wherein said overlay is attached to said outer face of said fire resistant layer by a second adhesive layer extending continuously across said area of said overlay so that said patch is secured over said area of said damaged portion by said first adhesive layer extending across said fire resistant layer and said base member and by said second adhesive layer extending across said portion of said overlay that extends beyond said periphery of said fire resistant layer.

* * * * *

UNITED STATES PATENT AND TRADEMARK OFFICE
CERTIFICATE OF CORRECTION

PATENT NO. : 5,654,063
DATED : August 5, 1997
INVENTOR(S) : Kirk et al.

It is certified that error appears in the above-identified patent and that said Letters Patent is hereby corrected as shown below:

In the Abstract, line 7, delete "intumescence" and substitute --intumescent--.

Column 1, lines 52, 57, 58, 60 and 63-64, delete "intumescence" and substitute --intumescent--.

Column 2, lines 3, 4, 6, 26 and 30, delete "intumescence" and substitute --intumescent--.

Column 4, line 20, delete "intumescence" and substitute --intumescent--.

Column 7, line 40, delete "intumescence" and substitute --intumescent--.

Column 7, line 40, delete "Which" and substitute --which--.

Column 9, lines 18, 47-48 and 53-54, delete "intumescence" and substitute --intumescent--.

UNITED STATES PATENT AND TRADEMARK OFFICE
CERTIFICATE OF CORRECTION

PATENT NO. : 5,654,063
DATED : August 5, 1997
INVENTOR(S) : Kirk et al.

It is certified that error appears in the above-identified patent and that said Letters Patent is hereby corrected as shown below:

Column 10, lines 13-14, delete "intumescence" and substitute --intumescent--.

Signed and Sealed this

Twentieth Day of January, 1998

Attest:

BRUCE LEHMAN

*Attesting Officer*         *Commissioner of Patents and Trademarks*